March 29, 1938.　　C. C. MEADOWS　　2,112,467
BRAKE HEAD
Filed June 2, 1932　　2 Sheets-Sheet 1
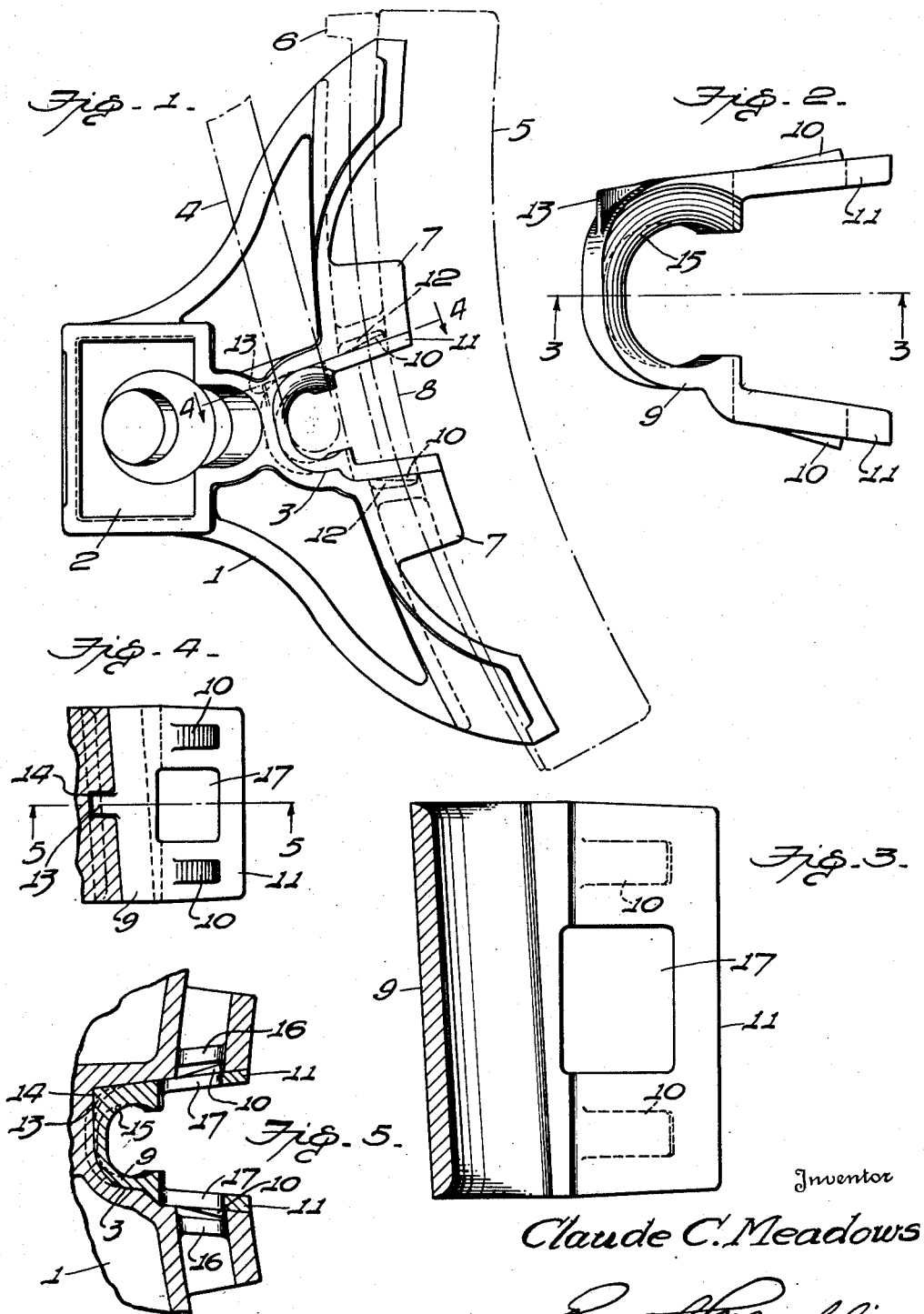
Inventor
Claude C. Meadows
By Ernest P. Mechlin
Attorney March 29, 1938. C. C. MEADOWS 2,112,467
BRAKE HEAD
Filed June 2, 1932 2 Sheets-Sheet 2
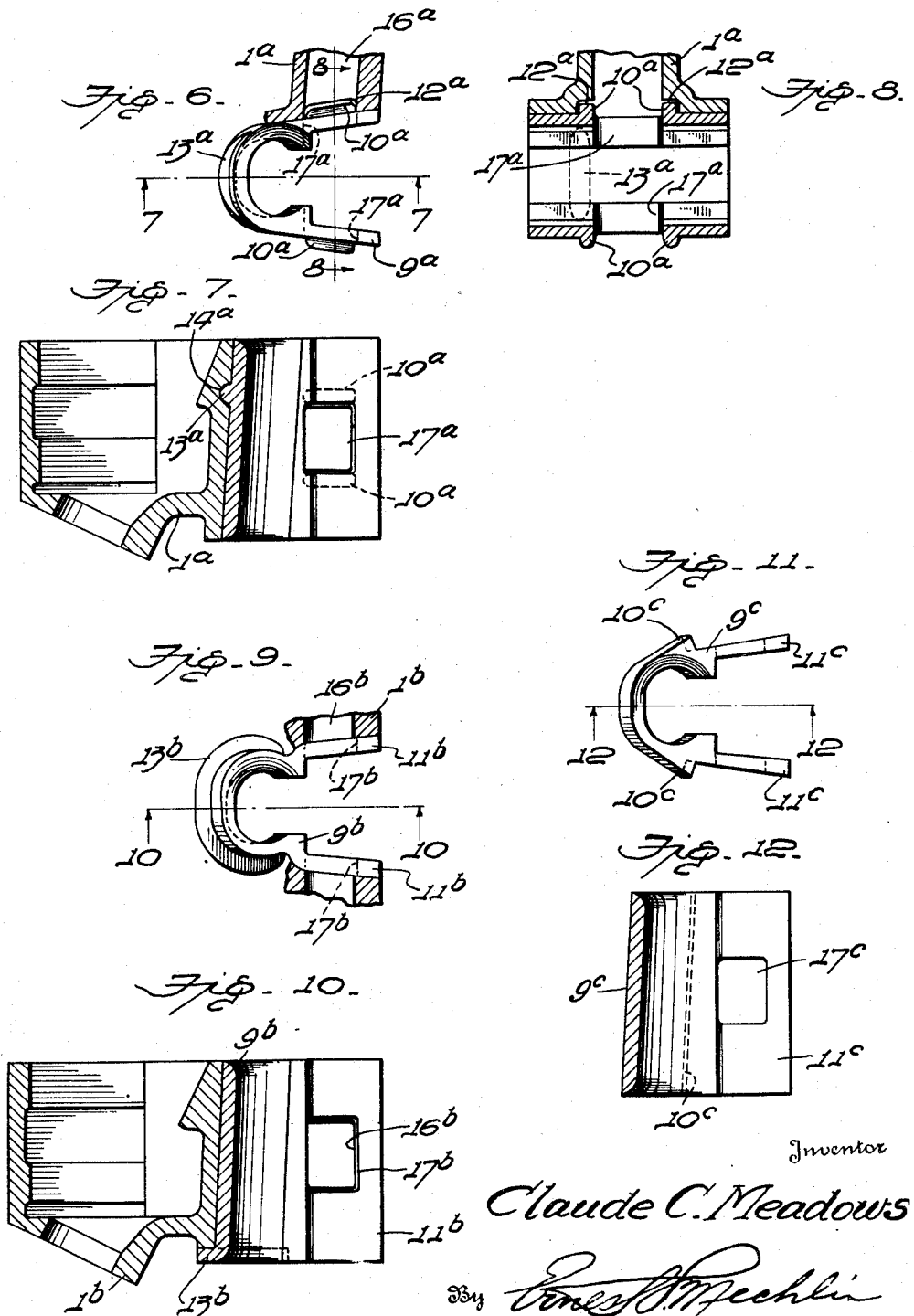
Inventor
Claude C. Meadows
By Ernest H. Mechlin
Attorney Patented Mar. 29, 1938

2,112,467

UNITED STATES PATENT OFFICE 2,112,467

BRAKE HEAD

Claude C. Meadows, Tulsa, Okla., assignor to Chicago Railway Equipment Company, Chicago, Ill., a corporation of Illinois Application June 2, 1932, Serial No. 615,059

6 Claims. (Cl. 188—236)

This invention relates to brake heads and, more particularly, to a renewable bushing for protecting a brake head from wear.

The principal object of my invention, generally considered, is the provision of a bushing adapted to be secured in a lug and hanger receiving recess of a brake head for protecting the head from wear, said bushing being preferably of hard spring material adapted to snap into place in said head, said head being correspondingly formed to interlock with said bushing.

Another object of my invention is to provide a bushing which is easily and cheaply replaceable in a brake head and preferably secured in the brake shoe lug and hanger receiving recess thereof to prevent wear on said head caused by contact and movement of the brake hanger and brake shoe lug, said bushing being preferably a steel casting, although it may be made of pressed steel, and desirably secured in place by interlocking lugs and pocketed portions on the bushing and head, said bushing being desirably resilient and sprung into position, and/or secured in place by the brake shoe key.

Other objects and advantages of the invention relating to the particular arrangement and construction of the various parts will become apparent as the description proceeds.

Referring to the drawings illustrating my invention:—

Figure 1 is a side elevation of a brake head and associated bushing embodying my invention, the associated brake shoe, key, and hanger being diagrammatically illustrated in place.

Figure 2 is a corresponding view of the bushing shown in Figure 1 removed from the head and shown on a larger scale.

Figure 3 is a vertical sectional view on the line 3—3 of Figure 2, looking in the direction of the arrows.

Figure 4 is a fragmentary sectional view on the line 4—4 of Figure 1, looking in the direction of the arrows.

Figure 5 is a fragmentary sectional view on the line 5—5 of Figure 4, looking in the direction of the arrows.

Figure 6 is a fragmentary sectional view corresponding to Figure 1, but showing a modification.

Figure 7 is a sectional view on the line 7—7 of Figure 6, looking in the direction of the arrows.

Figure 8 is a fragmentary sectional view on the line 8—8 of Figure 6, looking in the direction of the arrows.

Figures 9 and 10 are views corresponding, respectively, to Figures 6 and 7, but showing another modification.

Figure 11 is a view showing a further modification on a scale reduced as compared with Figure 2.

Figure 12 is a sectional view on the line 12—12 of Figure 11, looking in the direction of the arrows.

The combined action of vibration on the brake shoes at the present high running speeds of trains and the forces occasioned by braking cause rapid wear of the brake shoe center lug bearing in the head. Such wear permits the shoes to assume positions out of proper alignment and, in addition to the excessive wear on the head, causes rapid destruction of the shoe. It has been reported that in many cases heads are worn to the point of replacement in a comparatively short time, and that excessive wear also takes place in the brake hanger socket.

In accordance with my invention, I have devised a one-piece bushing or removable wearing liner for both shoe lug and brake hanger. In the event of excessive wear, the bushing may be replaced without disassembling the beam, which, at present, is necessary in applying a new head.

Referring now to the drawings in detail, and first considering the embodiment of my invention illustrated in Figures 1 to 5, inclusive, there is shown a head 1 apertured, as indicated at 2, to connect with the brake beam and formed with a recess 3 to receive the brake hanger 4 and the shoe 5, which shoe is secured in place by a key 6 received in corresponding apertures in interlocking lugs 7 and 8 on the head and shoe, respectively.

In order to prevent wear between the cross bar of hanger 4 and central lug 8 of the shoe and the head, I have provided a U-shaped bushing 9 normally interlocked in the recess 3 in the head as by lugs 10 on the legs 11 thereof, which are adapted to snap into place in pockets 12 in the head when the bushing 9 is forced or driven into place in the recess 3. In order to prevent endwise movement of the bushing 9 in the head 1, the same is desirably provided with a rib or fin 13 received in a corresponding notch or pocket 14. The upper portion of that part of the inner end of the bushing which connects the legs 11 is desirably thicker than the remainder, as indicated at 15 and shown most clearly in Figure 2, to more efficiently take care of wear from the hanger 4. For the same reason, the lower leg 11 is slightly thicker than the upper leg 11, because it receives the weight of the shoe 5 and would, therefore, be subjected to more wear than the upper leg.

Although I have described a bushing which is preferably formed of hard and resilient material, such as alloy steel, adapted to snap into place, I do not wish to be limited to this disclosure as, if desired, the bushing may be formed of any suitable material and be held in place by the key 6 passing through registering apertures 16 in the head and 17 in the legs of the bushing 9.

Referring now to the embodiment of my invention illustrated in Figures 6, 7, and 8, a bushing 9ª is there disclosed which, as in the previous embodiment, interlocks with the head 1ª by having lugs 10ª snapping into pockets or notches 12ª in the head to hold the bushing in place and forming extended bearings for the edges of the brake key. In the present embodiment, the lugs 10ª are of somewhat different shape from the lugs 10 of the preceding embodiment. The rib or fin 13ª received in a corresponding notch or pocket 14ª is also provided for preventing undesired sidewise movement of the bushing in the head. As in the preceding embodiment, the bushing may be held in place by the usual brake shoe key (not shown) passing through registering apertures 16ª in the head and 17ª in the bushing.

Referring now to the embodiment of my invention illustrated in Figures 9 and 10, a construction is there disclosed similar to the embodiment of Figures 6, 7, and 8, except that the legs 11ᵇ of the bushing 9ᵇ are not provided with interlocking lugs adapted to snap into place, as in the preceding embodiments, said bushing being retained in place by a shoe key (not shown) received in apertures 16ᵇ in the head 1ᵇ and apertures 17ᵇ in the bushing 9ᵇ, said apertures 17ᵇ, in the present embodiment, being formed slightly larger than the apertures 16ᵇ so as to eliminate wear on the brake shoe key by contact between it and the preferably harder metal of the bushing or liner 9ᵇ. Sidewise movement of the bushing in the present embodiment is restricted by an end flange 13ᵇ overlying the side of the head, adjacent the hanger receiving recess, rather than by a rib received in a corresponding notch in the head.

Referring now to the embodiment of my invention illustrated in Figures 11 and 12, a bushing 9ᶜ is there disclosed which corresponds generally with the bushing 9 of the first embodiment except that the holding lugs 10ᶜ are positioned farther from the ends of the legs 11ᶜ and their inclined outer faces merge with the curve of the inner end of the bushing to facilitate insertion of the bushing into the pocket in the head. The outer ends of bushing lugs 10ᶜ form shoulders for engaging the ends of the lug receiving openings in the head lug 7 to prevent movement of the bushing out of the head except when the bushing is compressed laterally to free the lugs 10ᶜ from the openings. There is no means other than the brake shoe key (not shown) provided for preventing endwise movement of said bushing. Said shoe key, as in the preceding embodiments, of course, passes through apertures 17ᶜ in the bushing and corresponding apertures (not shown) in the head.

From the foregoing disclosure, it will be seen that I have devised a renewable bushing adapted to be easily and cheaply replaced and efficiently serving to prevent wear on the brake head caused by contact and movement of the brake hanger and brake shoe lug. I preferably construct my bushing and associated head in such a manner that the combination is interchangeable with standard heads of similar character, so that in case of failure of a head and bushing involving my invention at a point where a similar head and bushing may not be conveniently obtained, a standard head may be applied for repairs. Although the bushing or liner is desirably formed with a steel casting, it may be formed of pressed steel, and although it is preferably resilient and snapped into place, where it is secured by lugs and/or ribs, I do not wish to be limited to this showing, and although a preferred form of my bushing involves certain features, it will be understood that all of them are not essential to the broad aspect of my invention, and I wish to be limited only by the spirit and scope of the appended claims.

I claim:—

1. A brake head formed with a lug for supporting a brake shoe lug and with a recess for receiving a brake shoe hanger, and a renewable bushing in said recess for protecting the head from wear by the hanger and the shoe lug, said bushing being of spring material and having rigid projections thereon adapted to snap into place in corresponding pockets in the head for securing the bushing in place.

2. A renewable bushing for protecting the faces of a brake head shoe-supporting lug and a hanger recess from wear by the brake shoe lug and the brake beam hanger, comprising a U-shaped member at least one outer side of which has an outwardly projecting rib with its outer face inclined toward the closed end of the member and forming an abrupt shoulder facing towards the open end of the member, said rib facilitating driving the bushing inwardly through the open end of the head recess and interlocking the device with the head.

3. In combination, a brake head formed with a shoe-supporting lug and with a hanger receiving recess extending inwardly from above said lug, there being a pocket in the face of said lug, and a renewable bushing movable over said lug and into said recess and having a rib extending longitudinally of its outer surface and inclined towards the inner end of the member, to facilitate movement of the bushing into position as described, and having a shoulder facing towards the outer end of the member for engaging the corresponding edge of said pocket to prevent accidental removal of the bushing.

4. In combination, a brake head formed with a lug for supporting a brake shoe lug and having a recess for receiving a brake shoe hanger, and a renewable bushing in said recess for protecting the head metal from wear by the hanger and the shoe lug, there being openings traversing said head lug and bushing for receiving the usual shoe retaining key, said head having pockets at the side of the opening therethrough and said bushing having upstanding ridges bounding the opening therethrough and fitting in said pockets for holding the bushing in place and to form extended bearing faces for said key.

5. A renewable bushing for protecting from wear portions of the top and bottom faces of a brake head shoe-supporting lug and hanger recess, said bushing being of U-shape and having openings through the legs for receiving the usual brake key, there being ridges at the sides of said openings to form an extended bearing for said key.

6. In combination, a brake head formed with a brake shoe-supporting lug and having a hanger receiving recess, and a bushing lining said recess for protecting the head metal from wear from the cross bar of the hanger and the lug of the shoe supported thereby, said bushing including a lip overlying the side of the head adjacent the portion thereof opposing the hanger.

CLAUDE C. MEADOWS.